United States Patent [19]

Durda

[11] Patent Number: 4,806,251

[45] Date of Patent: Feb. 21, 1989

[54] OSCILLATING PROPELLER TYPE AERATOR APPARATUS AND METHOD

[75] Inventor: Joseph A. Durda, Wazatta, Minn.

[73] Assignee: Aeration Industries, Inc., Chaska, Minn.

[21] Appl. No.: 907,990

[22] Filed: Sep. 16, 1986

[51] Int. Cl.⁴ .............................................. C02F 7/00
[52] U.S. Cl. ..................... 210/747; 210/758; 210/170; 210/220; 210/242.2; 261/87; 261/93
[58] Field of Search ............... 210/242.2, 219, 220, 210/747, 758, 170; 261/120, 91, 87

[56] References Cited

U.S. PATENT DOCUMENTS

| | | | |
|---|---|---|---|
| 3,108,146 | 10/1963 | Gross | 261/24 |
| 3,620,512 | 11/1971 | Muskat et al. | 210/242.2 X |
| 3,840,457 | 10/1974 | Wilson | 210/242.2 X |
| 3,975,469 | 8/1976 | Fuchs | 261/91 X |
| 4,240,990 | 12/1980 | Inhofer et al. | 210/220 X |
| 4,280,911 | 7/1981 | Durda et al. | 210/747 X |
| 4,308,137 | 12/1981 | Freeman | 210/242.2 X |
| 4,587,064 | 5/1986 | Blum | 210/242.2 X |

FOREIGN PATENT DOCUMENTS 55-2185  1/1980  Japan .............................. 210/242.2

Primary Examiner—Tom Wyse
Attorney, Agent, or Firm—Banner, Birch, McKie & Beckett

[57] ABSTRACT

An oscillating propeller type aerator apparatus for more efficiently aerating a liquid is disclosed. The oscillating propeller type aerator apparatus for aerating a substance according to the present invention includes a propeller type aerator and an oscillating support system. The aerator includes a tube, a propeller, and means for rotating the propeller. The oscillating support system supports the aerator with the tube and propeller at an acute angle below the surface of the substance to be aerated. The support system includes a mechanism for oscillating the tube and propeller through an angle about an axis transverse to the surface of the substance to be aerated in order to disperse over an arc related to said oscillating angle, air injected through said tube into the substance.

8 Claims, 1 Drawing Sheet

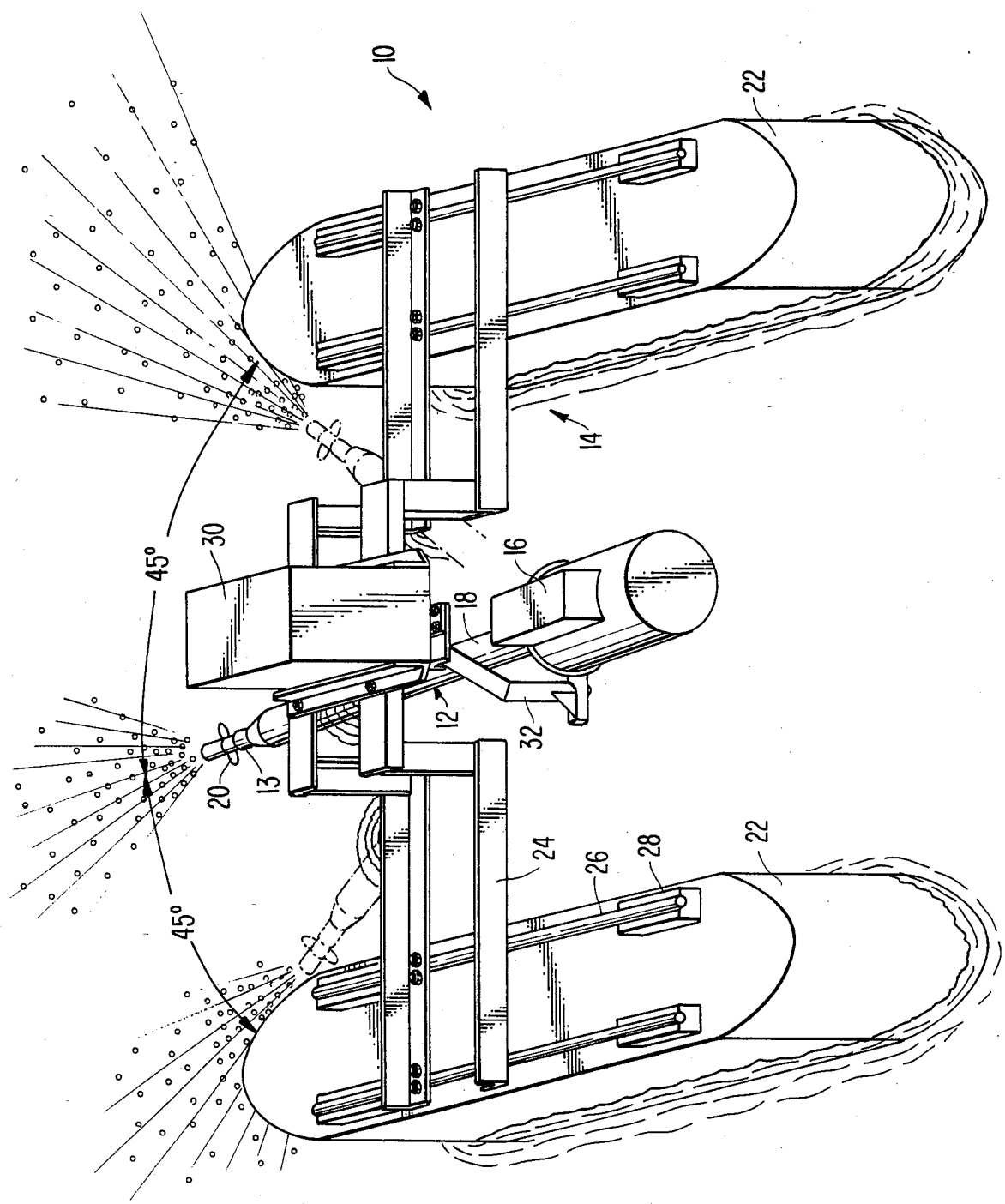

OSCILLATING PROPELLER TYPE AERATOR APPARATUS AND METHOD

TECHNICAL FIELD

The present invention relates to an apparatus and method of aeration. More particularly, the present invention relates to an improved apparatus and method for aerating a substance quickly and uniformly with a propeller type aerator.

BACKGROUND OF THE INVENTION

In biological purification of waste waters which contain organic solids, sediments are formed which are so firm that anaerobic zones occur within them. This leads to the creation of offensive odors and sedimentation. Dissolved oxygen is required to prevent the formation of these offensive odors and to biologically break down the organic matter within the water. Moreover, a certain amount of dissolved oxygen is required to sustain various aquatic organisms. Increasing the dissolved oxygen content of other substances, such as sludge, is necessary also. The supply oxygen to water, and the circulation of oxygen and water is also important to aquaculture, wherein fish, shellfish, and other marine life are kept in bounded natural bodies of water, tanks, or aquariums for commercial breeding purposes.

Aeration apparatus are used to increase the dissolved oxygen content of the treated substance and thereby purify it, and to supply and circulate oxygen to support marine life. One type of aeration apparatus is a propeller type aerator. These devices use an electric motor driven rotating propeller disposed below the surface of the substance being treated. The propeller draws in atmospheric air from an intake port through a draft tube and discharges it into the substance e.g. the waste water being treated or the water containing marine life.

Propeller type aerators can range in size, for example, from ½ hp to 100 hp. As the size of the aerator increases, the size of its support system likewise increases. The type of support system also depends on the type and size of the aerated substance container (e.g., basin, lagoon, or tank).

Known aeration systems rigidly support the aerator on a support system. In such a rigid support system the propeller discharges air along a relatively narrow section of the water in one direction only. In order to adequately aerate an entire large pond of water a system comprised of a plurality aerators is required. In locations where only a single aerator can be installed, for example where a single aerator is stationarily mounted on a wall of a pool, only a narrow frustoconical section of the pool is directly aerated. The remainder of the pool is not aerated until the directly aerated section diffuses.

SUMMARY OF THE INVENTION

It is an object of the present invention to provide an oscillating propeller type aerator which directly aerates a much larger portion of a substance being aerated than prior art devices.

It is another object of the present invention to provide an oscillating propeller type aerator which is not significantly larger than prior art fixed aerators.

These and other objects are accomplished by the oscillating aerator of the present invention. The oscillating propeller type aerator apparatus for aerating a substance according to the present invention includes a propeller type aerator and an oscillating support system. The aerator includes a tube, a propeller, and means for rotating the propeller. The oscillating support system supports the aerator with the tube and propeller at an acute angle below the surface of the substance to be aerated. The support system includes a mechanism for oscillating the tube and propeller through an angle about an axis transverse to the surface of the substance to be aerated in order to disperse over an arc related to said oscillating angle, air injected through the tube into the substance.

The present invention is also directed to a method for aerating a substance with a propeller type aerator. The method includes the steps of: supporting the tube and propeller of the aerator below the surface of the substance being aerated; injecting air into the substance through the tube; dispersing over an arc the injected air through the substance by moving the substance with the rotating propeller; and oscillating the tube and propeller through an angle about an axis transverse to the surface of the substance.

Various advantages and features of novelty which characterize the invention are further pointed out in the claims that follow. However, for a better understanding of the invention and its advantages reference should be had to the accompanying drawings and descriptive matter which illustrate and describe a preferred embodiment of the invention.

BRIEF DESCRIPTION OF THE DRAWING

The sole FIGURE is a perspective view of an oscillating aerator according to one embodiment of the present invention.

DETAILED DESCRIPTION OF THE INVENTION

The figure shows an oscillating propeller type aerator system 10 according to the present invention. A propeller type aspirating aerator 12 is attached to a support system 14. Aerator 12 comprises a motor 16 drivingly coupled to a tube 13 which extends through an outer housing 18 and out the lower end of aerator 12. A propeller 20 is attached to the lower end of tube 13. When motor 16 rotates tube 13, propeller 20 drives the liquid surrounding it, thereby aspirating air down tube 13 and into the liquid. Aerator 12 can be a relatively small aerator, for example, a 2 to 7½ horsepower aerator.

Support system 14 is a floatation type system wherein a pair of floats 22 float on the liquid being aerated. Floats 22 function as vertical supports, providing support vertically above the surface of the liquid. A pair of horizontal support bars 24 are connected to floats 22 by mounting bars 26 carried in bar rests 28 on the upper surface of floats 22. Support bars 24 extend horizontally between floats 22 and support aerator 10 at a desired horizontal location (preferably centrally) between floats 22. The support system need not be a flotation type, but could be a support coupled to a wall or other stationary member.

An oscillator mechanism 30 is mounted on horizontal support bars 24 above aerator 12. Oscillator mechanism 30 comprises pivot support arm 32 which is pivotably coupled to aerator 12 and a drive motor (not shown) which oscillates or rotates support arm 32. Aerator 12 is attached to support arm 32 so that tube 13 and propeller 20 are supported in the liquid at an acute angle. In operation, oscillator mechanism 30 swings aerator 12 back and forth preferably through an angle of 90°, 45° on either side of the standard position of the aerator. Oscillator mechanism 30 should oscillate aerator 12 through a minimum angle, for example 30° or more so that the motion of tube 13 and propeller 20 disperses the air through the liquid in an increased arc related to the angle of oscillation.

Numerous characteristics, advantages, and embodiment of the invention have been described in detail in the foregoing description with reference to the accompanying drawing. However, the disclosure is illustrative only and it is to be understood that the invention is not limited to the precise illustrated embodiment. Various changes and modifications may be effected therein by one skilled in the art without departing from the scope or spirit of the invention. For example, other embodiments of a propeller type aerator can be used with the system.

I claim:

1. An oscillating propeller type aerator apparatus for aerating a substance comprisng a propeller type aerator including a tube, a propeller and means for rotating the propeller, wherein air is injected into the substance through said tube and is dispersed by said propeller; a support system for supporting the aerator with the tube and propeller at an acute angle below the surface of the substance to be aerated, said support system including means for supporting the tube and propeller for pivotal motion about an axis transverse to the surface of the substance to be aerated; and drive means for periodically pivoting the tube and propeller in an oscillatory pattern during aeration through an angle about an axis transverse to the surface of the substance to be aerated in order to disperse over an arc related to said oscillating angle air being injected through said tube into the substance.

2. An oscillating propeller type aerator apparatus according to claim 1 wherein said oscillating means oscillates said tube and propeller through an angle of at least 45°.

3. An oscillating propeller type aerator apparatus according to claim 1 wherein said oscillating means oscillates said tube and propeller through an angle of at least 90°.

4. An oscillating propeller type aerator apparatus according to claim 1 wherein said support system includes framework, members supporting said oscillating drive means; an oscillating support arm carried and rotated by said oscillating drive means; and means for connecting said oscillating support arm to said aerator.

5. A method for aerating a substance with a propeller type aerator including a tube for directing air below the surface of the substance being aerated, a propeller and means for rotating the propeller comprising the steps of:
   supporting the tube and propeller of the aerator below the surface being aerated;
   injecting air into the substance through the tube; and
   dispersing the injected air through the substance by moving the substance with the rotating propeller, and further dispersing the injected air over an arc by periodically oscillating the tube and the propeller through an angle about an axis transverse to the surface of the substance while the air is being injected into the substance through the tubes and being dispersed by the rotating propeller.

6. A method according to claim 5 wherein the tube and propeller are oscillated through an angle of at least 45°.

7. A method according to claim 5 wherein the tube and propeller are oscillated through an angle of at least 90°.

8. A method according to claim 5 wherein the tube and propeller are supported in the substance at an acute angle below horizontal.

* * * * *